United States Patent [19]
Olson

[11] Patent Number: 6,016,573
[45] Date of Patent: Jan. 25, 2000

[54] PET SCARF WITH POUCH

[76] Inventor: Mary Lou Olson, 626 Armstrong Ave., St. Paul, Minn. 55102

[21] Appl. No.: 09/118,468

[22] Filed: Jul. 17, 1998

Related U.S. Application Data

[60] Provisional application No. 60/053,063, Jul. 18, 1997.

[51] Int. Cl.[7] .............................. A42B 5/00; A41D 27/20
[52] U.S. Cl. ........................................ 2/207; 2/247
[58] Field of Search .................. 2/49.2, 91, 144, 2/157, 207, 468, 247, 279

[56] References Cited

U.S. PATENT DOCUMENTS

| | | |
|---|---|---|
| 3,105,970 | 10/1963 | Herzberg . |
| 3,260,292 | 7/1966 | Costello . |
| 3,842,436 | 10/1974 | Hirschson . |
| 4,138,744 | 2/1979 | Pitzel . |
| 4,788,722 | 12/1988 | Oliver . |
| 5,025,508 | 6/1991 | Duncan . |
| 5,435,011 | 7/1995 | Nicolai et al. . |
| 5,685,016 | 11/1997 | Douglas . |
| 5,802,613 | 9/1998 | Marshall . |

*Primary Examiner*—Amy B. Vanatta
*Assistant Examiner*—Shirra L. Jenkins
*Attorney, Agent, or Firm*—Anthony G. Eggink

[57] ABSTRACT

A scarf, for pets, having a pouch incorporated therein comprised of a body made from a flexible material having at least three edges, a pouch encapsulated within the scarf body in which small articles, like disposable bags used for the disposal of animal waste, can be stored. The pouch has a closing structure which allows the user to resealably open and close the pouch. The scarf body also has a fastening structure that enables the scarf to be releasably affixed around the neck of a pet.

18 Claims, 2 Drawing Sheets

PET SCARF WITH POUCH

This application claims the benefit of U.S. Provisional Application No. 60/053,063, filed Jul. 18, 1997.

BACKGROUND OF THE INVENTION

This invention relates to scarves to be worn about the neck of pets, such as dogs. Particularly, this invention relates to scarf-like structures that are placed around the neck of a pet and which has an interior pouch for storing disposable bag structures.

There exist various ordinances and laws in the U.S.A. regarding the activities of pets and their owners. For example, such laws exist which make a pet owner responsible for any deposited feces of the pet. To this end, manufacturers, such as D.T. Labs, Inc., manufacture and sell clean-up devices, invented by the present applicant, that neatly and easily permit an owner to pick up feces using a disposable bag or pouch and to store the feces in the bag until it can be thrown away. Examples of such bags are found in U.S. Pat. Nos. 4,964,188 and 5,301,806. Although these disposable devices are very helpful, a problem still arises in having such cleanup devices available when needed and also for providing means to carry such clean up devices. The pet scarves of the present invention provide means to solve this dilemma.

SUMMARY OF THE INVENTION

The pet scarf with pouch of the present invention is constructed and arranged to be placed around the neck of a pet, such as a dog. The scarf is generally triangular in shape and has an inside and outside surface. The scarves may be constructed in various sizes to accommodate the size of the pet's neck. Opposing fastening tabs extend from each end of one leg of the triangular scarf body. The tabs provide the means to hold and secure the scarf around the dog's neck and may contain a hook and loop closure structure, for example. The hook and loop tabs are used to fasten the scarf around the neck of a pet, however, other fastening means may also be used in this invention. On the inside surface of the triangle point that is not aligned with the hook and loop closing tabs, an openable and closable pouch is provided. The pouch or pocket structure is also triangulated in shape, and it is held closed by a second hook and loop closure structure. Disposable clean-up bag structures for picking up and storing pet feces are stored in this pouch structure until one needs to be used. In this manner, the pet relieves its owner of the burden of carrying the clean-up bags. A plurality of clean-up bags along with other personal goods may be stored in the pouch.

These and other benefits of this invention will become clear from the following description by reference to the drawings.

DESCRIPTION OF THE PREFERRED EMBODIMENTS

Figure 1:
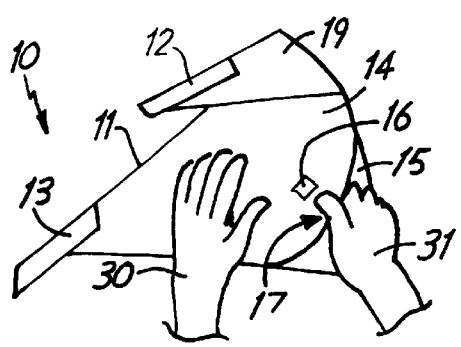
FIG. 1 is a rear view of the pet scarf showing the pouch being opened on the inside thereof.

FIG. 1 shows the pet scarf 10 of the present invention. As shown, the pet scarf 10 has a body 11 having a triangular structure. The body 11 is comprised of at least one ply of material. For example, two or more plies may be used in the embodiments of this invention. The pet scarf is preferably constructed of a flexible, strong materials, such as cloth or the like. The triangulated body structure 11 is shown to have opposing apexes having fastening tabs 12 and 13 attached thereto. The fasteners 12 and 13 are preferably hook and loop type fasteners which cooperate to easily attach the scarf 10 about the neck of a pet, such as a dog.

Figure 7:
FIG. 7 is an elevational view showing the pet scarf placed about the neck of a dog.

FIG. 7 shows a scarf 10 fastened about the neck area 33 of a dog 32. The scarf 10 may be constructed in a number of sizes to accommodate the circumference of the pet's neck, i.e., x-small, small, medium, large and x-large.

Figure 2:
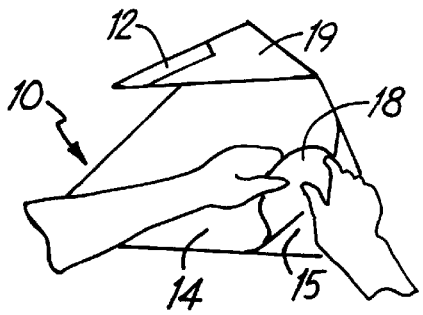
FIG. 2 is a rear view of the pet scarf of FIG. 1 and showing the pouch and the manner in which the disposable bags are stored therein.
Figure 3:
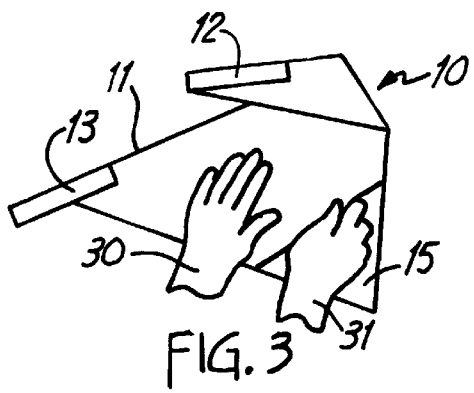
FIG. 3 is a rear view of the scarf showing the pouch being closed.

The scarf 10 has opposing surfaces 14 and 19, namely, inside surface 14 and outside surface 19 as shown in FIGS. 1–3. Extending upwardly from the bottom of the third apex, a pouch 15 is positioned. The pouch or pocket 15 is preferably sewn to the scarf body 11, however, other attachment means, i.e., adhesives and the like, may also be used. The scarf material may be folded partially over itself to create the pouch. The pouch 15 has a configuration in which a number of disposable clean-up bags may be stored. The top of pouch 15 is shown to have an internally disposed closing structure 17 which cooperates with a closure 16 attached to the inside surface 14. This closure structure is also preferably a hook and loop fastening structure. It is within the purview of this invention, however, that other closing structures may be utilized in connection with this invention. For example, zippers, tie-type closures, snaps, etc. may also be used to fasten the scarf 10 about the neck of a pet, many closing structures may also be utilized to close the pouch 15 to the body of scarf 10.

FIG. 2 shows a clean-up bag 18 being removed from pouch 15 of the scarf 10. The hands of the user, namely, hands 30 and 31 are shown throughout the drawing FIGS. 1–6. Each drawing figure shows a step utilizing the pouch in the scarves of the invention. Although the pouch 15 is designed to hold a number of such disposable cleanup bags 18, other items may also be stored therein, such as keys, money or other personal belongings. FIG. 3 shows the pouch 15 being closed by the hand of a user.

Figure 4:
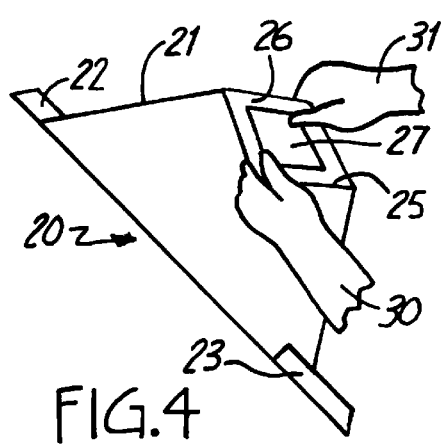
FIG. 4 is a perspective view of another embodiment of the pet scarf of this invention and wherein the pouch is being opened.
Figure 5:
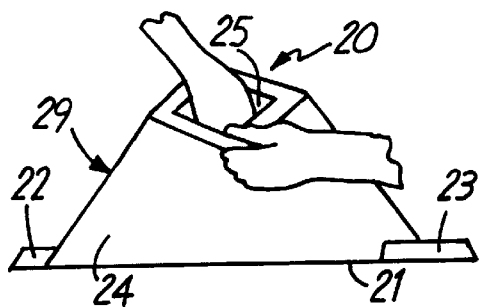
FIG. 5 is another view of the scarf embodiment of FIG. 4 and wherein a disposable bag is obtained from the inside thereof.
Figure 6:
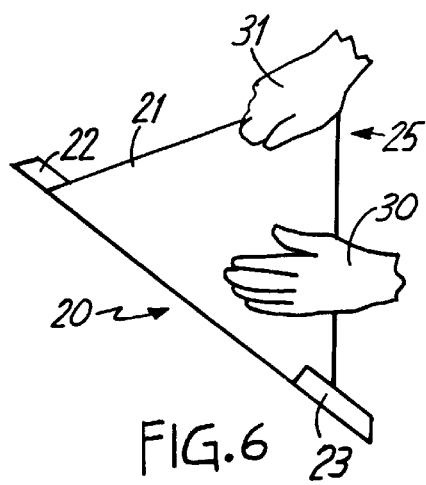
FIG. 6 is another view of the scarf embodiment of FIG. 4 and wherein the interior pouch is being closed.

FIGS. 4 through 6 show an alternate embodiment 20 of the scarf of the present invention. As shown, opposing hook and loop tabs 25 and 26 are provided at the apex or corner of the scarf body 21. The apex area is shown to be separable to thereby allow entry into the interior of the scarf 20. Thus, the pouch 27 is placed within the interior of the scarf body 21. The cooperating closures or tab portions may extend along the apex sides or along portions thereof. The closing structure is used to separate the inner and outer plies of the scarf and wherein the pouch is defined by the opposing plies or the flexible sides of the scarf. FIGS. 5 and 6, respectively show the removal of a disposable bag and the closing of the scarf body of embodiment 20.

As shown in FIGS. 4–6, the scarf embodiment 20 is shown to have a body 21 with opposing exterior surfaces 24 and 29. Fastening tabs 22 and 23 are shown attached at the apex portions of the generally triangular body 21.

The pet scarf of the present invention may be made of any flexible material, including fabrics and like materials. The scarves may be constructed of one, two or more plies. For example, the scarf embodiment 10 may have a stitched double ply body and have a pouch of one or more plies attached to the inside ply. Likewise, the scarf embodiment 20, wherein the pouch is defined on the opposing plies of the scarf may also be constructed of a pair of double ply sides which are stitched or otherwise fastened together.

The bags used in conjunction with the pet scarf with pouch of the present invention are preferably as disclosed in U.S. Pat. Nos. 4,964,188 and 5,301,806, which are incorporated herein by reference.

As many changes are possible to the embodiments of this invention utilizing the teachings thereof, the descriptions above and the accompanying drawings should be interpreted in the illustrative and not in the limited sense.

That which is claimed is:

1. A scarf, for pets, having a pouch incorporated therein, said scarf comprising:
   (a) a scarf body having a top edge and at least two side edges, an inside surface and an outside surface, said scarf body being comprised of at least one ply of material, said body being partially folded over itself creating a plurality of folded plies each having a top and at least two side edges;
   (b) a pouch formed between two of said folded plies of material and having an opening generally parallel to said top edge, said side edges attached to said scarf body and said opening unattached to said scarf body, and whereby an article may be stored therein;
   (c) a pouch closing structure; and
   (d) a fastening structure for fastening said scarf body to a pet.

2. The scarf of claim 1, wherein said fastening structure is a set of hook and loop fasteners.

3. The scarf of claim 1, wherein said pouch is formed by folding the scarf body partially over itself.

4. The scarf of claim 1, wherein said body is comprised of at least two plies of material.

5. The scarf of claim 4, wherein said pouch is formed between two of said plies.

6. The scarf of claim 1, wherein said pouch closing structure is a set of hook and loop fasteners.

7. The scarf of claim 1, wherein said article is a disposable bag.

8. The scarf of claim 1, wherein said scarf body is generally triangular in shape.

9. The scarf of claim 1, wherein said flexible material is cloth.

10. The scarf of claim 1, wherein said body edges are stitched.

11. A scarf, for pets, having a pouch incorporated therein, said scarf comprising:
   (a) a scarf body being generally triangular in shape having an inside surface, an outside surface, two top corners, a bottom corner, two side edges, and a top edge, said scarf body being comprised of more than one ply of flexible material;
   (b) a pouch encapsulated within said scarf body, said pouch being formed between two of said plies of material and whereby an article may be stored therein;
   (c) a pouch closing structure located at said bottom corner and partially along the portions of said side edges nearest to said bottom corner; and
   (d) a fastening structure for fastening said scarf body to a pet.

12. The scarf of claim 11, wherein said fastening structure is comprised of a set of hook and loop fasteners located at said top corners of said scarf body.

13. The scarf of claim 11, wherein said top edge of said scarf body is partially folded over itself to create a reinforced top edge and a tab at each of said top corners.

14. The scarf of claim 13, wherein said fastening structure is a set of hook and loop fasteners located on the tabs at each of said top corners.

15. The scarf of claim 11, wherein said pouch closure structure is a set of hook and loop fasteners.

16. The scarf of claim 15, wherein said pouch is formed through the application of a smaller ply of flexible material, to said inside surface of said scarf body, having at least three edges and having one edge containing one article of said set comprising said pouch closing structure thereon and said other edges being adhered to said inside surface of said scarf body.

17. The scarf of claim 16, wherein said scarf body is constructed and arranged to fit above the neck of a dog.

18. A scarf, for pets, having a pouch incorporated therein, said scarf comprising:
   (a) a scarf body having a first ply of flexible material comprised of at least a top edge, two side edges, two top corners, a bottom corner, an inside surface, an outside surface and having a second smaller ply of flexible material having at least a top edge and two side edges, said second ply adhered along said side edges to said inside surface along said side edges of said first ply;
   (b) a pouch formed between said first ply and said second ply having an opening generally parallel to said top edge of said scarf and removed from said top edge, whereby an article may be stored therein;
   (c) a pouch closing structure having two portions, said first portion adhered to said top edge of said second ply and said second portion adhered to said inside surface and positioned on said inside surface such that said two portions cooperate to close said pouch; and
   (d) a fastening structure for fastening said scarf body to a pet.

* * * * *